(12) United States Patent
Jenisch et al.

(10) Patent No.: US 7,590,847 B2
(45) Date of Patent: Sep. 15, 2009

(54) MOBILE AUTHENTICATION FOR NETWORK ACCESS

(75) Inventors: Markus Jenisch, Waiblingen (DE); Stephan Rupp, Besigheim (DE)

(73) Assignee: Alcatel, Paris (FR)

( * ) Notice: Subject to any disclaimer, the term of this patent is extended or adjusted under 35 U.S.C. 154(b) by 774 days.

(21) Appl. No.: 11/205,215

(22) Filed: Aug. 17, 2005

(65) Prior Publication Data

US 2006/0069916 A1    Mar. 30, 2006

(30) Foreign Application Priority Data

Sep. 30, 2004   (EP)   ................... 04292340

(51) Int. Cl.
*H04L 9/00* (2006.01)
(52) U.S. Cl. ............... 713/172; 713/150; 713/171
(58) Field of Classification Search ............. 713/172, 713/171, 150
See application file for complete search history.

(56) References Cited

U.S. PATENT DOCUMENTS

| | | | |
|---|---|---|---|
| 6,421,768 B1 | 7/2002 | Purpura | |
| 2003/0061512 A1 | 3/2003 | Flurry et al. | |
| 2004/0078571 A1 | 4/2004 | Haverinen | |
| 2004/0107360 A1 | 6/2004 | Herrmann et al. | |
| 2004/0120295 A1 | 6/2004 | Liu et al. | |

FOREIGN PATENT DOCUMENTS

WO    WO 00/02406 A    1/2000

(Continued)

OTHER PUBLICATIONS

Two integrated schemes of user authentication and access control in a distributed computer network Jan, J.-K.; Tseng, Y.-M.; Computers and Digital Techniques, IEE Proceedings—vol. 145, Issue 6, Nov. 1998 pp. 419-424.*

(Continued)

*Primary Examiner*—David Y Jung
(74) *Attorney, Agent, or Firm*—Patti, Hewitt & Arezina LLC

(57) ABSTRACT

The present invention provides a method for authenticating a user to a network by means of a temporary and/or one-time password. The temporary and/or one-time password is provided by a service provider that can be accessed by means of a mobile telecommunication device. The temporary password is provided on demand, when the user invokes a corresponding access request that is transmitted to the service provider by means of the mobile telecommunication device. The service provider checks and asserts a received access request and generates the temporary password by making use of a dedicated cryptographic method. The generated temporary password is finally transmitted to the personal mobile device of the user that is adapted to transmit the received temporary password to a gateway of a network in order to authenticate the user to the network. Moreover, the mobile telecommunication device provides establishing of an IP-based connection between a user's computing device and the network. The mobile telecommunication device therefore provides establishing of at least two communication links to the network and to the user's computing device. In this way, an authentication procedure can be autonomously performed by means of the user's personal mobile telecommunication device. Installing and/or maintaining authentication related software on the user's computing device therefore becomes superfluous.

10 Claims, 4 Drawing Sheets

FOREIGN PATENT DOCUMENTS

| WO | WO 03/032618 A | 4/2003 |
|---|---|---|
| WO | WO 03/077572 A | 9/2003 |

OTHER PUBLICATIONS

Integrated alerting and system broadcast channel for a wireless access system Varma, V.K.; Noerpel, A.R.; Harasty, D.J.; Vehicular Technology, IEEE Transactions on vol. 45, Issue 1, Feb. 1996 pp. 157-163.*

Access priority schemes in UMTS MAC Chuah, M.; Zhang, Q.; Yue, O.; Wireless Communications and Networking Conference, 1999. WCNC. 1999 IEEE Sep. 21-24, 1999 pp. 781-786.*

Al-Qayedi A et al: "Combined web/mobile authentication for secure web access control" Wireless Communications and Networking Conference, 2004. WCNC. 2004 IEEE Atlanta, GA, USA, Mar. 21-25, 2004, Piscataway, NJ, USA, IEEE, vol. 2, Mar. 21, 2004, pp. 677-681, XP010707918.

Wullems C et al: "Enhancing the security of internet applications using location: A new model for tamperresistant GSM location" Computers and Communication, 2003 (ISCC 2003). Proceedings. Eighth IEEE International Symposium on Jun. 30-Jul. 3, 2003, Piscataway, NJ, USA, IEEE, 2003, pp. 1251-1258, XP010646297.

N. Haller; Bellcore; C. Metz; Kaman Sciences Corporation; P. Nesser; Nesseer & Nesser Consulting; M. Straw; Bellcore: "RFC 2289- A One-Time Password System" IETF Standard, Feb. 1998, pp. 1-25, XP015008073.

* cited by examiner

|  | User 1 | User 2 | User 3 | User 4 |
|---|---|---|---|---|
| network 1 | denied | denied | admitted | admitted |
| network 2 | admitted | denied | denied | denied |
| network 3 | denied | denied | denied | denied |
| network 4 | admitted | admitted | admitted | denied |

Fig. 4

MOBILE AUTHENTICATION FOR NETWORK ACCESS

FIELD OF THE INVENTION

The present invention relates to the field of authentication to networks, in particular without limitation to networks based on Internet protocol (IP).

The invention is based on a priority application, EP 04292340.9, which is hereby incorporated by reference.

BACKGROUND AND PRIOR ART

The working environment for companies dealing with large amount of data is nowadays dominated by computers and in particular by networked computers. These corporate networks provide an efficient communication platform for the staff of a company or other institutions, like universities. These corporate networks effectively allow to provide IT services to a well defined group of persons, as e.g. employees of a company. Corporate networks also provide a basis for establishing an Intranet that provides company specific data only to those computers that are physically connected to the corporate network. In this way, a corporate network effectively prevents external access to confidential company specific data or company specific IT services, such as e.g. company specific software. Consequently, an employee of a company can only access company specific data and IT services when the employee makes use of a computer that is physically embedded into the corporate network.

Due to the large expansion of the Internet, data and IT services principally became accessible worldwide. Moreover, due to an increasing mobility of members of a staff, it is therefore highly desirable also to provide access to corporate networks from computers that are located at remote locations and that may contact a corporate network via the Internet. In this way an employee could access the corporate network or Intranet from his home or from a hotel when on business travel. Worldwide access to corporate networks via the Internet is in principle realizable. However, Internet based communication is rather un-secure and typically does not meet the stringent security requirements of a corporate network.

Here, the concept of virtual private network (VPN) provides a general solution. A VPN is a private communications network that is typically used within a company or by several different companies or organisations that communicate over a public network. VPN message traffic is typically carried on public networking infrastructure, e.g. the Internet, using standard and hence possibly un-secure communication protocols, such as IPv4. Virtual private networks use cryptographic tunnelling protocols to provide the necessary confidentiality, sender authentication and message integrity to achieve the privacy intended. When properly chosen, implemented, and used, such techniques can indeed provide secure communications over un-secure networks.

Nowadays, there exists a plurality of different implementation schemes for establishing VPNs. There exists a plurality of different VPN protocols that for example include IP security (IPSEC) that is an obligatory part of IPv6, Point to Point Tunnelling Protocol (PPTP), Layer 2 Forwarding (L2F) and Layer 2 Tunnelling Protocol (L2TP).

For almost any VPN a secure authentication is required. For example, when an employee of a company wants to access the corporate network either from home or during business travel, the employee may typically make use of a portable computer and a dedicated authentication device, such as a Token. The mobile computer is typically provided with a dedicated authentication software, such like a VPN client. In order to authenticate the mobile computer to a VPN gateway of the corporate network, the user has to enter a one-time password into the mobile computer. Such a one-time or temporary password is generated by the Token that is implemented as hardware and carried along with the user. When handed over to the employee, the Token is typically synchronised with the VPN gateway of the corporate network in order to provide the one-time password to the employee.

This temporary and/or one-time password might be subject to modification after a predefined time interval has elapsed. For example, the password to be generated by the Token changes once a minute and is determined via a cryptographic function. Typically, the one-time password is graphically displayed on the Token. The employee can then enter the one-time password with his username in order to authenticate to the corporate network. Since, the combination of user name and one-time password is valid for a maximum of one minute, the authentication scheme making use of the one-time password provides a high level of security.

Tokens that are implemented as hardware devices for secure authentication to corporate networks are for example commercially available as RSA SecurID that are distributed by Secur Integration GmbH, 51107 Cologne, Germany; see also www.securintegration.de.

Even though the above described authentication scheme making use of one-time temporary passwords based on hardware Tokens provides a high level of security for establishing VPN IP-based connections, it is rather disadvantageous for the employee or user to carry along such a hardware implemented Token. In particular, when an employee or a private person requires remote access to a plurality of different corporate networks, for each one of these networks a dedicated hardware Token is required. Also, when e.g. a plurality of employees share the same mobile computer for business travel purpose, the above described access scheme might be rather inconvenient, because for each user of the mobile computer, a manual configuration of the VPN client software installed on the mobile computer is required.

This disadvantage becomes even more pronounced where a user makes use of several mobile computing devices, such as e.g. a laptop computer and a Personal Digital Assistant (PDA), each of which having a VPN client for individually accessing a corporate network. Then, for each mobile computing device a device specific hardware Token might be required. Also, when a software update of the VPN client software becomes available, the corresponding update procedure has to be applied to each one of the computing devices that feature a VPN client software. Such an update procedure for a plurality of mobile computing devices is typically quite cumbersome and time intensive.

Generally, these aspects certainly limit the diversity and universality of the above described VPN based secure authentication scheme.

The present invention therefore aims to provide and to realize a secure authentication scheme that does not require to carry along a network specific piece of hardware, such as a Token.

SUMMARY OF THE INVENTION

The present invention provides a method of authenticating a user to a network. The user makes use of at least one computing device. The IP-connection between the network and the at least one computing device is provided by a mobile telecommunication device. The inventive method of authenticating the user to the network comprises requesting a temporary password from a service provider by transmitting an access request to the service provider. This access request is transmitted by means of the mobile telecommunication device. Once received by the service provider, the access request is checked on the basis of a user authentication database. If the user is authorized to access the network, the corresponding access request will be asserted by the service provider and consequently the temporary password will be generated in response to the assertion of the access request.

In contrast to the prior art solution, where the user of the corporate network has to carry along a network specific hardware Token, the invention provides delivery of the one-time password to the user by making use of a mobile telecommunication device, such as a cellular phone. Hence, the user that wishes to authenticate to a network transmits a dedicated access request to a service provider by means of his cellular phone. The service provider then provides the functionality of the former hardware Token and generates the network specific one-time password for the user. Typically, generation of the network specific one-time password is only performed by the service provider in response to an assertion of the user's identity and the user's authorization to the network.

The inventive method can be implemented into existing mobile communication networks by expanding the capabilities of a telecommunication provider. Hence, the telecommunication provider has to administrate a user authentication database providing information whether a specific user is authorized to access a distinct network. Moreover, the user authentication database may further specify various levels of authentication and various levels of access rights of a user of a network.

Checking of the access request and generating the temporary password not necessarily has to be provided by a telecommunication provider. Moreover, the inventive authentication service might be provided by any other provider. It must only be guaranteed, that the requested service, i.e. providing a temporary one-time password to the user, is accessible via a mobile phone.

In this way, a user is effectively enabled to authenticate and to establish a VPN connection to e.g. a corporate network without carrying along a network specific hardware Token. Hence, the entire functionality of a hardware Token as it is known in the prior art, is effectively replaced by installing a corresponding service by means of a service provider that is accessible via a mobile phone of the user. Advantageously, the user has no longer to carry along an additional hardware device that only serves to provide a temporary password for authenticating to a VPN network. In this way, a user may also authenticate to a plurality of different networks by making use of his mobile telecommunication device.

Moreover, the mobile telecommunication device provides physical access to the corporate network. Hence, the functionality of the mobile telecommunication device becomes twofold. First, it provides communication with a service provider in order to obtain a required password; a functionality that effectively replaces a hardware Token. Second, it also establishes physical access to a network and provides the IP based connection between the mobile computing device and the network.

When transmitting the access request to the service provider, the user also specifies which one of a plurality of networks he wishes to access. Hence, the access request is therefore at least indicative of a user identification and a network the user wishes to access. Now, depending on the parameters provided by the access request, the service provider may generate the appropriate one-time password. In this way, the functionality of a plurality of hardware Tokens is merged by means of the service provider.

According to a preferred embodiment of the invention, the method further comprises establishing the IP-based connection between the at least one computing device and the network by means of the mobile telecommunication device. The mobile telecommunication device is further adapted to established the IP-based connection in response to receive the temporary password from the service provider. In case that no temporary password is transmitted from the service provider to the mobile telecommunication device, access to the network as well as establishing of the IP-based connection between the network and the at least one computing device is refused.

The mobile telecommunication device is therefore also adapted to communicate with the at least one computing device of the user by means of an appropriate communication interface, either by means of a pluggable wired connection or by means of wireless data transmission, that might be based on e.g. radio frequency (RF)—or infrared transmission protocols, such like Bluetooth® or IrDA® (for further details refer to www.bluetooth.org or www.irda.org). Moreover, the mobile telecommunication device is adapted to provide a communication link between the network and a plurality of different computing devices, even in a simultaneous mode. In this way, by implementing the secure access mechanism entirely into the mobile telecommunication device, secure access to a network can be provided irrespectively of the actual computing device.

After generation of the temporary password by the service provider, the temporary password is transmitted from the service provider to the mobile telecommunication device. The mobile telecommunication device may in turn be adapted to autonomously establish the IP-connection to the network and to authenticate the user to the network. Establishing of the IP-connection as well as performing the authentication in response to a receipt of the temporary password might be performed with user interaction. Hence, upon receipt of the temporary password, the user may have to confirm execution of the authentication procedure. However, by incorporating IP-connection establishment and authentication into a single user specific or personalized device, an authentication to a corporate network might be completely automated solely by means of the personalized mobile telecommunication device.

According to a further preferred embodiment of the invention, requesting of the temporary password from the service provider further comprises authenticating the user to the service provider. When for example the service provider is implemented as a mobile communication provider, for accessing services of the mobile communication provider the user has to make use of an appropriate card, like a subscriber identity module (SIM) card in combination with a corresponding personal identification number (PIN). Once being authorised to access the services of the telecommunication provider, requesting of the temporary password for authenticating to the VPN network may further require an additional authentication step that might be implemented by entering an additional PIN. In this way, an additional protection mechanism for receiving of the temporary password is effectively implemented.

Hardware Tokens that are known in the prior art may require entering of a PIN in order to receive a one-time password. Such a PIN request that activates generation of the temporary password can be implemented in an analogous way into the inventive method. Hence, the access request being transmitted to the service provider, further has to comprise a corresponding PIN that serves to authenticate the user of the mobile device to receive the temporary password.

This authentication method prohibiting misuse of the temporary password generating functionality of the service provider is typically implemented on top of the service provider's access scheme. This service providers access scheme typically consists of a combination of SIM card and SIM card specific PIN. In this way, for receiving the temporary one-time password from the service provider, the user has to enter a first PIN into the mobile telecommunication device in order to access the service provider. Then, in order to receive the temporary password, the service provider may require a second PIN for authorization of the user with respect to the VPN network. Preferably, these first and second PINs are implemented as static passwords that might be arbitrarily configured by the user.

According to a further preferred embodiment of the invention, the access request being transmitted to the service provider further comprises at least a network identifier and an identifier of the mobile telecommunication device. The identifier of the mobile telecommunication device is indicative of the user's identity. In the framework of mobile telecommunication, any communication partner is assigned with an individual number, such as e.g. a number of the cellular phone. By means of this mobile phone number, the user of the respective mobile phone can be identified. Assignment between a user and a phone number is typically realized by means of an identifier of the SIM card of the mobile phone. In this way, the user's identity is inherently resolved by transmitting the access request to the service provider.

Since the access request is further indicative of an identifier of the network, sufficient information for generating the temporary password is therefore given to the service provider. The user authorization database that is administered by the service provider provides required information whether a specific user is authorized to access a distinct network. In this way, the access request can be sufficiently checked on the basis of the user authentication database. The user authentication database therefore effectively allows to assert or to deny an access request and hence to enable or to disable generation and transmittance of a temporary password to the user.

According to a further preferred embodiment of the invention, the temporary password can be transferred between an authentication module and a communication module of the mobile telecommunication device. Hence, the twofold functionality of the mobile telecommunication device might be realized by means of two separate modules of the telecommunication device. Typically, the authentication module provides requesting and receiving of the temporary password from the service provider, whereas the communication module is adapted to establish the IP connection to the network. This separation into two separate modules provides an additional access control when transferring of the temporary password form the authentication module to the communication module requires a prompt of the user. Hence, accidental authorization and connection establishing can be effectively prevented.

Alternatively, this protection mechanism might be switched off by the user. In this case, the temporary password might be autonomously transmitted between the authentication module and the communication module upon receipt from the service provider. In this way establishing of the IP connection between a corporate network and an at least first mobile computing device can be performed without any user interaction. The user may only have to invoke the authentication procedure by selecting a one-time password request function on his mobile telecommunication device and entering the first and/or second PIN.

According to a further preferred embodiment of the invention, the network is implemented as an IP-based virtual private network (VPN). The VPN network comprises a VPN gateway and the mobile telecommunication device comprises a VPN client. Moreover, the at least one computing device can be implemented as any arbitrary kind of computing device, such as a workstation being installed in an immobile way in an employee's home, a mobile laptop computer for accessing the corporate network from any location worldwide or as a personal digital assistant (PDA).

In this way the entire functionality of the secure access scheme is implemented into the mobile telecommunication device which therefore provides secure VPN based access to a corporate network for a plurality of various computing devices. In principle, none of the computing devices requires a network or computing device specific VPN client. Hence, the entire secure access scheme is implemented into a personal device, such as a cellular phone.

Hence, irrespectively of a particular mobile or immobile computing device, a user may access a virtual private network solely by making use of his personalized mobile telecommunication device. Consequently, even the same computing device can be shared by various users, each of which having a personalized secure access to the VPN via his own mobile telecommunication device. Therefore, installing of authorization related software on a computing device, such as VPN client, is no longer required, thus allowing to reduce software maintenance for the computing devices. This is particularly advantageous when for instance an employee makes use of several computing devices, each of which requiring establishing and authorizing to a VPN. In this case, an available software update of a VPN client only has to be updated once on the employees mobile telecommunication device instead of updating the VPN client software several times for each one of the plurality of computing devices.

Also, in a sophisticated embodiment, the functionality of the computing device and the mobile telecommunication device might be incorporated and merged in a single multifunctional device, such as cellular phones with integrated computing facilities providing web browsing, email service, text processing applications and the like.

In another aspect the invention provides a mobile telecommunication device for authenticating a user to a network by means of a temporary password. The temporary password is required by the user in order to authenticate to a network. The mobile telecommunication device comprises means for transmitting an access request to a service provider, means for receiving the temporary password from the service provider, wherein the temporary password is generated by the service provider in response to an assertion of the access request. Furthermore, the inventive mobile telecommunication device comprises means for establishing the IP-based connection between at least one computing device and the network. The means for establishing the IP-based connection are adapted to establish the connection in response to receive the temporary password from the service provider.

The mobile telecommunication device provides a twofold functionality. First, it provides submitting an access request to a service provider and receiving of a corresponding temporary password in case of assertion of the access request. Second, the mobile telecommunication device provides establishing a secure IP-connection between at least one computing device and the network by making use of the received temporary password. Hence, the mobile telecommunication device may autonomously authenticate the user to the network by submitting the received temporary or one-time password to the network. In this way a secure access scheme is entirely provided by the inventive mobile telecommunication device.

A conceivable, particularly low cost embodiment of the mobile telecommunication device can be implemented by making use of a commercially available cellular phone providing a programmable functionality and appropriate data transmission capabilities. In this way, a specific software application can be installed on the existing cellular phone that allows for selecting a dedicated menu item on the cellular phone that is adapted for transmitting the access request to the service provider. In this way the inventive method of authentication can be universally realized from a user's point of view by installing an appropriate software application on his programmable cellular phone. Such software applications might be provided in form of Java applications or Java applets that may be supported by the telecommunication or service provider. This feature makes the inventive authentication scheme universally applicable to a wide range of users.

Moreover, the mobile telecommunication device has to provide a communication interface that allows to transmit data between the at least one computing device and the network. Therefore the mobile telecommunication device might be equipped with an appropriate communication interface, either in a wired and pluggable embodiment or by means of a wireless implementation that may be based on e.g. RF-based or infrared data transmission. Additionally, the mobile telecommunication device may even serve to transmit data to a plurality of computing devices. It therefore may even act as a router.

In another aspect, the invention provides an authentication server for generating a temporary password that is required by a user in order to authenticate to a network. The inventive authentication server comprises means for processing of an access request from the user, means for checking the access request on the basis of a user authentication database and means for generating the temporary password. Here, the access request is transmitted to the authentication server by the user making use of a mobile telecommunication device. The means for checking of the access request that is received by the authentication server are adapted to assert the access request if the user is authorized to access the network.

The user's authorization or authorization of several users to a variety of different networks is provided by the user authentication database. Furthermore, the means for generating the temporary password are particularly adapted to generate the temporary password only in response to an assertion of the access request. In this way, the authentication server provides checking of the access request, asserting the access request and when the service request has been asserted, to generate a corresponding temporary password. Typically, the authentication server is administered and provided by a telecommunication provider or by a similar provider in such a way, that the service of the authentication server is accessible from a mobile telecommunication device such as a cellular phone.

According to a further preferred embodiment of the invention, the user authentication database of the authentication server comprises authentication data of at least one user and at least one network. The authentication data stored in the user authentication database specifies which one of the at least one users is authorized to access any of the at least one networks.

In still another aspect, the invention provides a computer program product for mobile telecommunication device for authenticating a user to a network by means of a temporary password. The temporary password is required by the network for authenticating the user to the network, typically a VPN network. The computer program product comprises program means that are adapted to process an access request of the user, to transmit the access request to a service provider and to receive the temporary password from the service provider. Here, the temporary password is generated by the service provider in response to the assertion of the access request. Finally, the computer program product for the mobile telecommunication device comprises program means for directly transmitting the temporary password to the network in order to authenticate the user to the network and to establish an IP-based connection between the network and at least one computing device via the mobile telecommunication device. The program means being adapted to establish the IP-based connection in response to receive the temporary password from the service provider.

In still another aspect the invention provides a computer program product for an authentication server for generating a temporary password that is required by a user in order to authenticate to a network. The computer program product comprises program means that are adapted to process an access request from the user, to check the access request on the basis of a user authentication database and to generate the temporary password only in response to an assertion of the access request. The access request is asserted by making use of the user authentication database. In particular, the access request is asserted if the user is authorized to access the network. Additionally, the access request is transmitted to the authentication server by means of a mobile telecommunication device of the user and the temporary password is returned to the mobile telecommunication device if the access request is asserted.

BRIEF DESCRIPTION OF THE DRAWINGS

In the following preferred embodiments of the invention will be described in greater detail by making reference to the drawings in which.

DETAILED DESCRIPTION OF THE INVENTION

Figure 1:
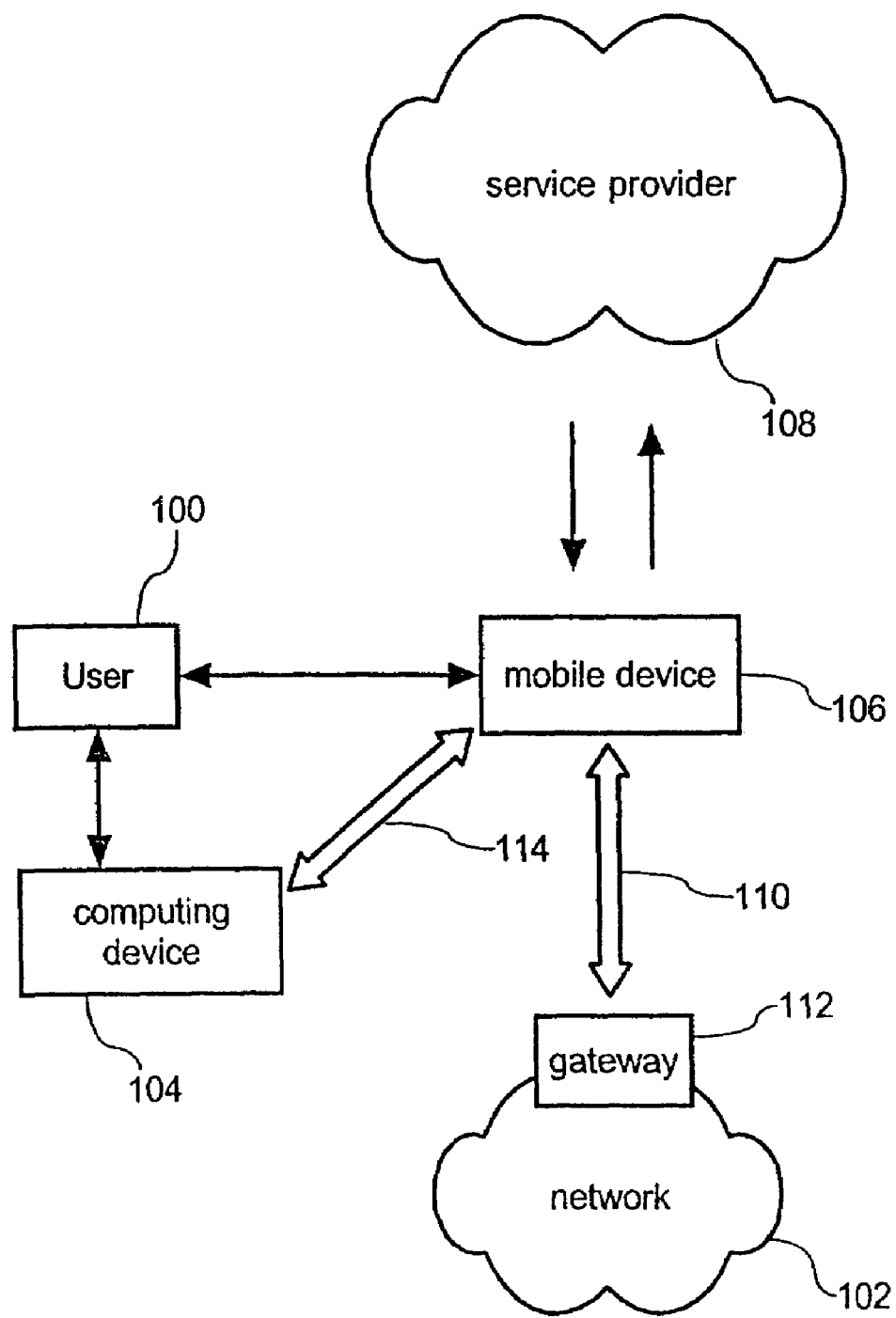
FIG. 1. shows a block diagram being illustrative of a first embodiment of the inventive authentication method, FIG. 2. shows a block diagram illustrating a second embodiment of the invention incorporating a first and a second network as well as first and second computing devices, FIG. 3. shows a block diagram schematically illustrating the internal structure of the service provider, FIG. 4. schematically illustrates a basic embodiment of the user authentication database.

FIG. 1 schematically illustrates an environment or infrastructure for realizing the inventive authentication method. A user 100 wishes to access a network 102 via a computing device 104. The user 100 further has access to his personal mobile device 106 that is in turn adapted to communicate with the service provider 108 and to establish an IP-based connection to the network 102. Accessing the network 102 requires authentication to the network 102. This authentication is typically performed by the network gateway 112.

Upon successful authentication to the network 102, the mobile device 106 establishes a connection 110 to the network 102 as well as a connection 114 to the computing device 104. Hence, the functionality of the mobile device 106 is twofold. On the one hand it provides submitting an access request to the service provider 108 and receiving a temporary and/or one-time password from the service provider in order to authenticate the user 100 to the network 102. On the other hand, the mobile device 106 also establishes the IP-based connection between the computing device 104 and the network 102 via connections 114 and 110. Typically, the illustrated network 102 and its gateway 112 are implemented as VPN network and VPN gateway, respectively.

The temporary and/or one-time password is generated and provided to the mobile device 106 by the service provider 108. Typically, the mobile device 106 can be implemented as a cellular phone that allows for a bidirectional communication with the service provider 108. In order to obtain the temporary password from the service provider 108, the user 100 may invoke an access request on the mobile device 106. The mobile device 106 in turn serves to transmit this access request to the service provider 108. Then, the service provider 108 processes this received access request, asserts the access request, i.e. checks the user's authorization to access the network 102, generates the temporary password by making use of a dedicated cryptographic password generation scheme and transmits the generated temporary and/or one-time password to the mobile device 106.

In response to receive the temporary password, the mobile device 106 may display the received temporary password to the user 100. The user 100 may then prompt the displayed password in order to confirm an authentication procedure that is successively and autonomously performed by the mobile device 106. If the user 100 confirms to access and to authenticate the network 102, the mobile device 106 will transmit a user identifier and the corresponding temporary password to the gateway 112 of the network 102. In response to receive the correct combination of temporary password and user identifier, the user 100 is then authenticated to access the network 102.

Alternatively, the user 100 may invoke an entirely automated authentication procedure that does not require prompting of the user. In this case the user 100 invokes the authentication procedure by entering a respective command into the mobile device 106. The mobile device 106 then transmits a corresponding access request to the service provider 108 and autonomously submits the temporary password received from the service provider 108 to the network 102. In this way, the mobile device 106 autonomously performs authentication of the user 100 to the network 102 and establishes an IP-based connection between the computing device 104 and the network 102.

In this way, the mobile device 106 in combination with the service provider 108 effectively replaces a hardware implemented Token that is adapted to generate a network specific temporary password. Further, the user 100 does no longer have to carry along an additional hardware device that is merely adapted to generate temporary one-time passwords. The invention is based on the fact, that the mobile device 106 is a personal belonging of the user 100. By implementing the password requesting functionality into the mobile device 106, the mobile device 106 effectively takes over the functionality of a hardware Token as it is known in the prior art.

The connections 110 and 114 between the computing device 104 and the network 102 can in principle be implemented by any type of connection that provides data transmission between a computing device and a network. For example, the connection can be realized by a 56 Kbit modem based connection, an ISDN connection or a DSL connection. The connection may also be implemented as a wireless connection and might be based on e.g. WLan, IEEE 802.11 or other radio frequency (RF) or infrared (IR) based communication protocols.

Figure 2:
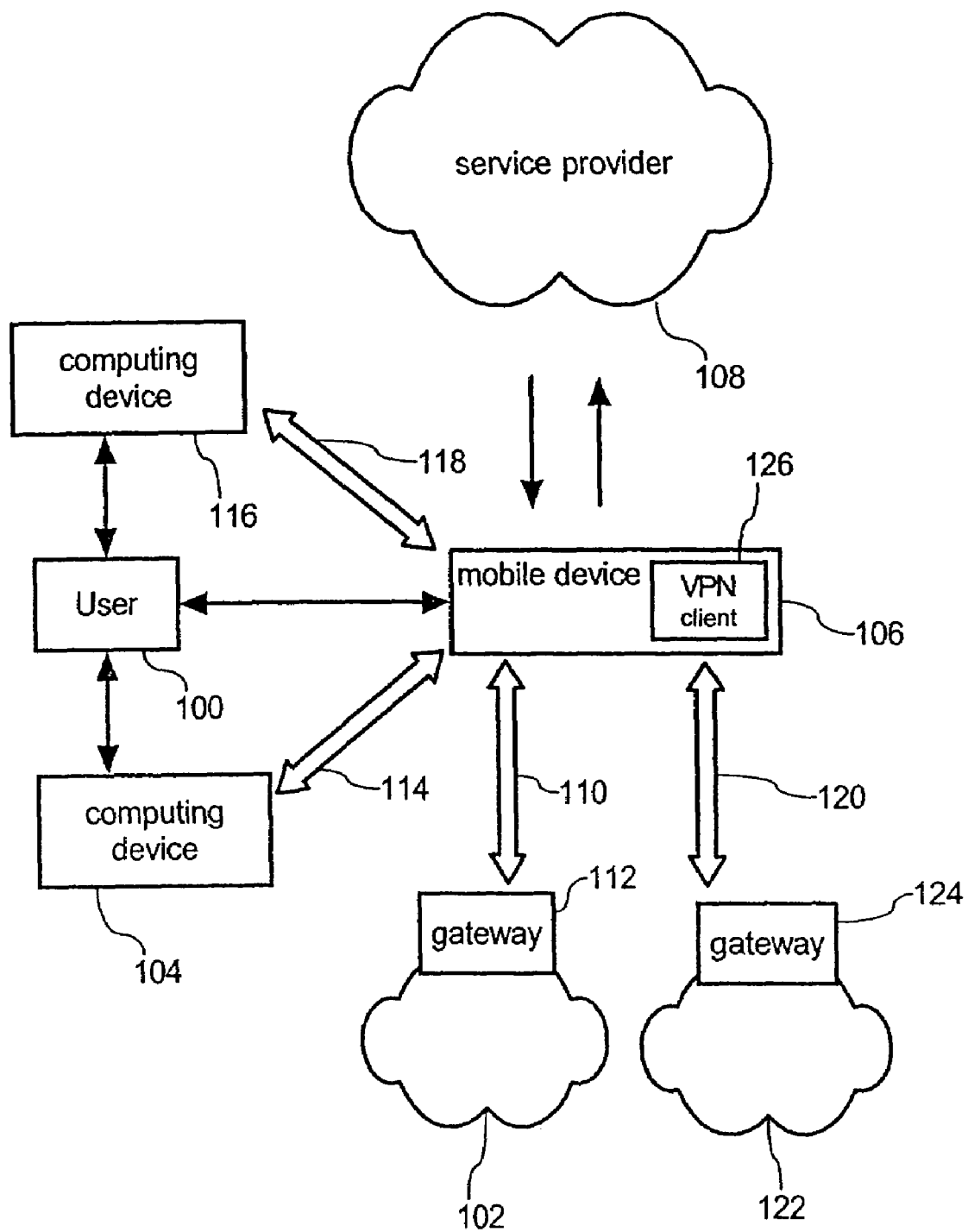

FIG. 2 schematically illustrates an internet based embodiment of the inventive authentication procedure in a more detailed and slightly more sophisticated way. Also here, the user 100 makes use of the mobile device 106 in order to receive a temporary password from the service provider 108 and to access a network 102, 122. In contrast to the embodiment illustrated in FIG. 1, the user 100 may access one or a plurality of networks 102, 122 either separately by means of two separate IP-based connections 110, 120, or by making use of the Internet, in which the two networks 102, 122 might be embedded. In addition, the mobile device 106 provides access to the networks 102, 122 for a plurality of computing devices 104, 116 via communication links 114, 118. Moreover, the mobile device 106 features a VPN client 126 that is adapted to perform a VPN-based authentication and access scheme to the networks 102, 122 by means of interacting with the respective network gateways 112, 124.

In particular, by implementing the VPN client 126 into the mobile device 106, VPN related software no longer has to be installed and maintained on any of the computing devices 104, 116. This allows for a secure access to a plurality of networks 102, 122 with a variety of computing devices 104, 116 by making use of a single, personalized device 106 that might be implemented as a cellular phone and that is typically carried along with the user 100 anyway. Additionally, this access scheme also allows to variably interchange any computing device 104, 116 among a plurality of users 100 or employees of a company. It must be only guaranteed that the computing devices 104, 116 are able to communicate with the mobile device 106 via communication links 114, 118 that may either be implemented as a pluggable wired connection making use of a standard interface, such like the Universal Serial Bus (USB), or by making use of some wireless transmission protocol that might be based on RF or infrared transmission techniques.

Access control to the networks 102, 122 might be implemented by means of an authentication database that is administered by the service provider 108 and that specifies which one of the networks 102, 122 is accessible by the user 100. For example, access to network 102 might be denied whereas access to network 122 might be admitted. In this case, when the user submits an access request to the service provider 108 by making use of his mobile phone 106, the user will only receive a temporary password when the access request specifies network 122. If the user 100 submits an access request to the service provider 108, thereby wishing to authenticate to network 102, the service provider will deny the access to network 102. Consequently, delivery of a one-time and/or temporary password for accessing network 102 is disabled and the mobile device 106 does not receive the required password from the service provider 108.

Figure 3:
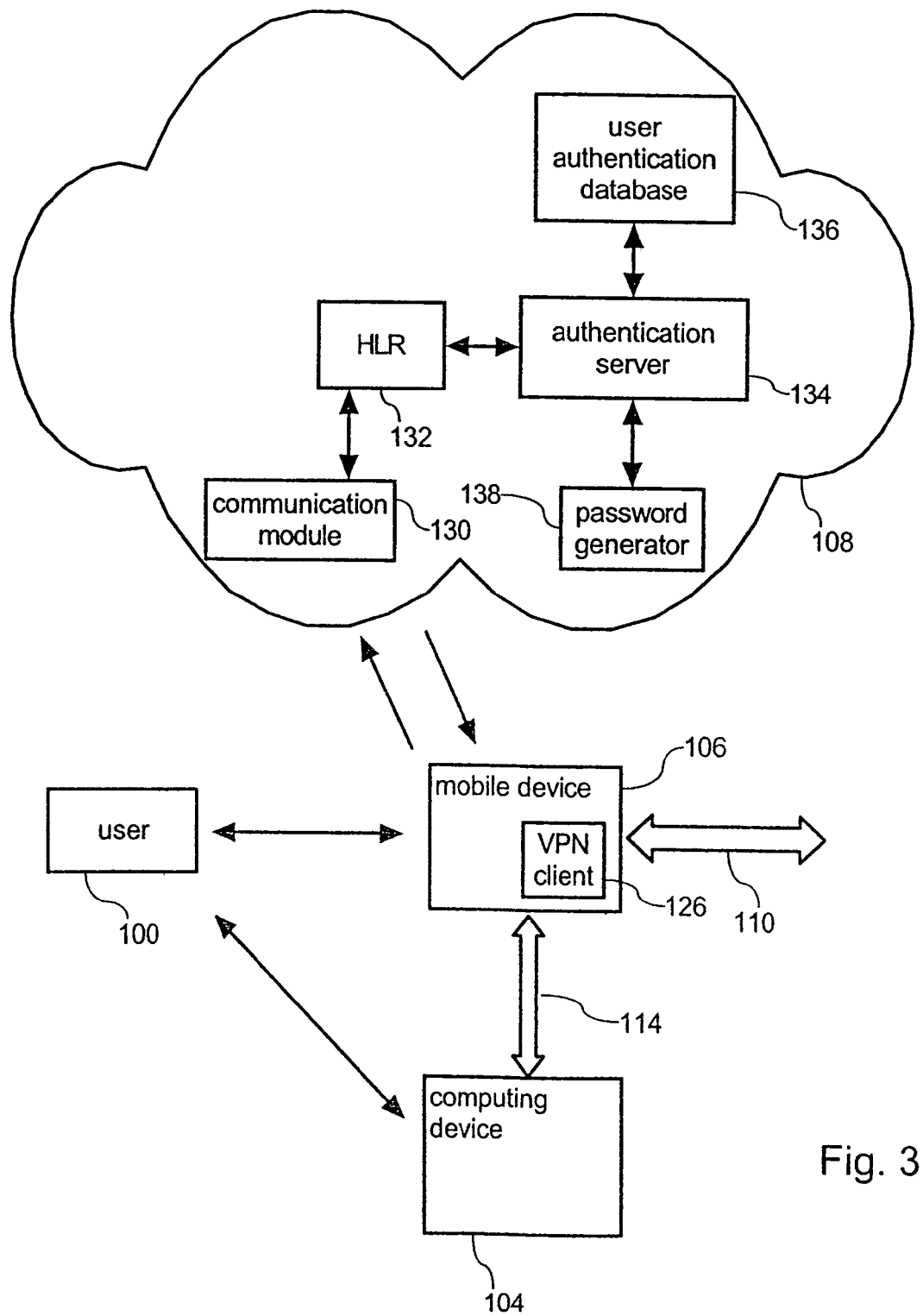

FIG. 3 schematically illustrates the internal structure of the service provider 108. In this embodiment, the service provider 108 also serves as a telecommunication provider. The service provider 108 has a communication module 130, a home location register (HLR) 132, an authentication server 134, a password generator 138 as well as a user authentication database 136. The communication module 130 provides signal processing for wireless data transmission. The communication module 130 may further provide wireless communication means in order to communicate with the mobile device 106.

The home location register 132 stores user related information for the wireless communication by means of the mobile device 106. Upon registering to the service provider 108, the user 100 may receive a SIM card with a specific identifier. By means of the home location register 132, assignment between the user's contact information and the SIM card can be effectively performed. The user's contact information may refer to personal data of the user as well as address of the user and bank account details of the user. Moreover, the home location register 132 effectively provides authentication of the mobile device 106 to the mobile communication network provided by the telecommunication provider 108. Typically, the user 100 and his mobile device 106 authenticate to the services of the service provider 108 by entering of e.g. a 4 digit PIN into the mobile device 106.

In a similar way, the authentication server 134 controls access of the user 100 to the user authentication database 136. In response to receive the access request from the mobile device 106, the authentication server 134 may first check whether the user 100 and the mobile device 106 are authorized to receive a temporary password from the service provider 108. This authentication procedure may be effectively realized by means of another, second static PIN. Whenever the user 100 submits a valid access request to the service provider, i.e. submitting the access request together with the appropriate static PIN, the authentication server 134 makes use of the user authentication database 136 in order to assert or to deny the access request of the user.

In particular, the user authentication database 136 is indicative, whether the user 100 is entitled to access the requested network. Once, an access request is asserted by the authentication server 134, the password generator 138 is invoked in order to generate an appropriate temporary one-time password. Generation of the password by means of the password generator 138 is based on cryptographic methods that are synchronized with matching cryptographic methods used by the VPN gateways of the networks 102, 116.

After generation of the temporary and/or one-time password, the generated password is transmitted to the authentication server 134 and is finally forwarded to the communication module 130. The communication module 130 further serves to transmit the generated password to the mobile device 106. Here, the received temporary password is either displayed to the user 100 for confirmation purpose or it might be directly transmitted to the VPN gateway 112 of the network 102 via the IP-based connection 110. The connection 110 is typically implemented by means of a wireless connection making use of e.g. infrared or radio frequency communication techniques, such as IEEE 802.11, Wireless LAN or UMTS. Alternatively, the mobile device 106 might be provided with a high speed communication interface that allows for wired based coupling to a high speed communication interface such like DSL or ISDN.

FIG. 4 schematically illustrates a basis embodiment of the user authentication database 136. Here, the user authentication database 136 is adapted to provide authorization information for several users and several different networks. Therefore, the user authentication database 136 is arranged as a two dimensional matrix, where the users are arranged in a horizontal user array 150 and the networks are arranged in a vertical network array 152. The single fields of the matrix like user authentication database 136 now specify which user is authorized to use which type of network. For example, user 1 has access to network 2 and network 4 but is not allowed to access network 1 and network 3.

FIG. 4 gives only a basic example of how to implement the user authentication database. The database 136 is by now means restricted to a two dimensional array. Moreover, additional parameter like individual access rights might be incorporated leading to a multidimensional representation of the user authentication database.

The invention claimed is:

1. A method of authenticating a user to a network, the method performed on at least one computing device where the at least one computing device comprises a personal computing device, the user making use of the at least one computing device, wherein an IP-connection between the network and the at least one computing device is provided by a mobile telecommunication device, the method of authenticating the user comprising the steps of:
   requesting a temporary password from a service provider by transmitting an access request to the service provider, where the at least one computing device is configured to transmit the access request by means of the mobile telecommunication device,
   checking the access request on the basis of a user authentication database and asserting the access request if the user is authorized to access the network,
   generating the temporary password in response to an assertion of the access request,
   transmitting the temporary password from the service provider to the mobile telecommunication device, the mobile telecommunication device being adapted to authenticate the user to the network and authenticating the user to the network by means of the mobile telecommunications device.

2. The method according to claim 1, further comprising establishing the IP-based connection between the at least one computing device and the network by means of the mobile telecommunication device, establishing of the IP-based connection being performed in response to receiving the temporary password from the service provider.

3. The method according to claim 1, wherein requesting of the temporary password from the service provider further comprises authenticating the user to the service provider.

4. The method according to claim 1, wherein the access request comprising at least a network identifier and an identifier of the mobile telecommunication device is indicative of the user's identity.

5. The method according to claim 1, wherein the network is an IP-based virtual private network (VPN), the network comprising a VPN gateway and the mobile telecommunication device comprising at least one VPN client.

6. A mobile telecommunication device for authenticating a user to a network by means of a temporary password, the mobile telecommunication device comprising:
   means for transmitting an access request to a service provider,
   means for receiving the temporary password from the service provider, the temporary password being generated by the service provider in response to an assertion of the access request,
   means for establishing an IP-based connection between at least one computing device and the network, said means being adapted to establish the IP-based connection in response to receive the temporary password from the service provider.

7. The mobile telecommunication device according to claim 6, further comprising means for wireless data transmission between the at least one computing device and the mobile telecommunication device.

8. An authentication server for generating a temporary password required by at least one user in order to authenticate to at least one network, the authentication server comprising:
   means for processing an access request from the at least one user, the access request being transmitted to the authentication server by the at least one user making use of a mobile telecommunication device,
   means for checking the access request on the basis of a user authentication database, the means for checking being further adapted to assert the access request if the at least one user is authorized to access the at least one network, means for generating the temporary password, said means being further adapted to generate the temporary password only in response to an assertion of the access request.

9. A computer program product executing on a mobile telecommunication device for authenticating a user to a network by means of a temporary password, the computer program product comprising program means being adapted to:
process an access request of the user
transmit an access request to a service provider,
receive the temporary password from the service provider, the temporary password being generated by the service provider in response to an assertion of the access request,
establish an IP-based connection between at least one computing device and the network, said means being adapted to establish the IP-based connection in response to receiving the temporary password from the service provider.

10. A computer program product executing on an authentication server for generating a temporary password required by a user in order to authenticate to a network, the computer program product comprising program means being adapted to:
processing an access request from the user, the access-request being transmitted to the authentication server by the user making use of a mobile telecommunication device,
checking the access request on the basis of a user authentication database, and checking the access request comprising asserting the access request if the user is authorized to access the network,
generating and transmitting the temporary password only in response to the assertion of the access request.

* * * * *

UNITED STATES PATENT AND TRADEMARK OFFICE
CERTIFICATE OF CORRECTION

| | | |
|---|---|---|
| PATENT NO. | : 7,590,847 B2 | Page 1 of 1 |
| APPLICATION NO. | : 11/205215 | |
| DATED | : September 15, 2009 | |
| INVENTOR(S) | : Jenisch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Twenty-first Day of September, 2010

David J. Kappos
*Director of the United States Patent and Trademark Office*